United States Patent [19]
Komoto et al.

[11] Patent Number: 5,750,636
[45] Date of Patent: May 12, 1998

[54] PROCESS FOR THE PREPARATION OF A HIGH-MOLECULAR-WEIGHT POLYCARBODIIMIDE SOLUTION

[75] Inventors: Yasuyoshi Komoto; Yasuyuki Takiguchi; Ken Yahata; Akira Hayashida; Minoru Takamizawa, all of Kanagawa-ken, Japan

[73] Assignee: Shin-Etsu Chemical Co., Ltd., Tokyo, Japan

[21] Appl. No.: 658,165

[22] Filed: Jun. 4, 1996

[30] Foreign Application Priority Data

Jun. 7, 1995 [JP] Japan ..................... 7-140145

[51] Int. Cl.⁶ .................... C08G 73/10; C08G 18/02
[52] U.S. Cl. .................... 528/310; 528/126; 528/170; 528/322; 528/332; 528/353; 525/419; 525/420
[58] Field of Search ..................... 528/126, 170, 528/332, 322, 353, 310, 367; 525/419, 420

[56] References Cited

FOREIGN PATENT DOCUMENTS 2292316  12/1990   Japan .
5178954   7/1993   Japan .

OTHER PUBLICATIONS

Tod W. Campbell, et al "High Polymers Containing the Carbodiimide Repeat Unit" J. Org. Chem., 28, pp. 2069–2075, 1963; the month of publication is not available.

Donald J. Lyman, et al. "Polycarbodiimides and Their Derivatives", Die Maktomol. Chem. 67, pp. 1–9, 1963. The month of publication is not available.

Primary Examiner—P. Hampton-Hightower
Attorney, Agent, or Firm—McAulay Fisher Nissen Goldberg & Kiel, LLP

[57] ABSTRACT

This invention provides a process wherein a stable solution of polycarbodiimide with a number-average molecular-weight of 5,000 to 60,000 can be very easily prepared by using an organic diisocyanate (e.g., 2,4-tolylene diisocyanate or 2,6-tolylene diisocyanate) as starting material, a cyclic phosphine oxide as catalyst and a chlorinated aromatic compound as solvent and by controlling certain reaction conditions within the reaction temperature range of 110° to 150° C.

7 Claims, 2 Drawing Sheets

F I G. 1
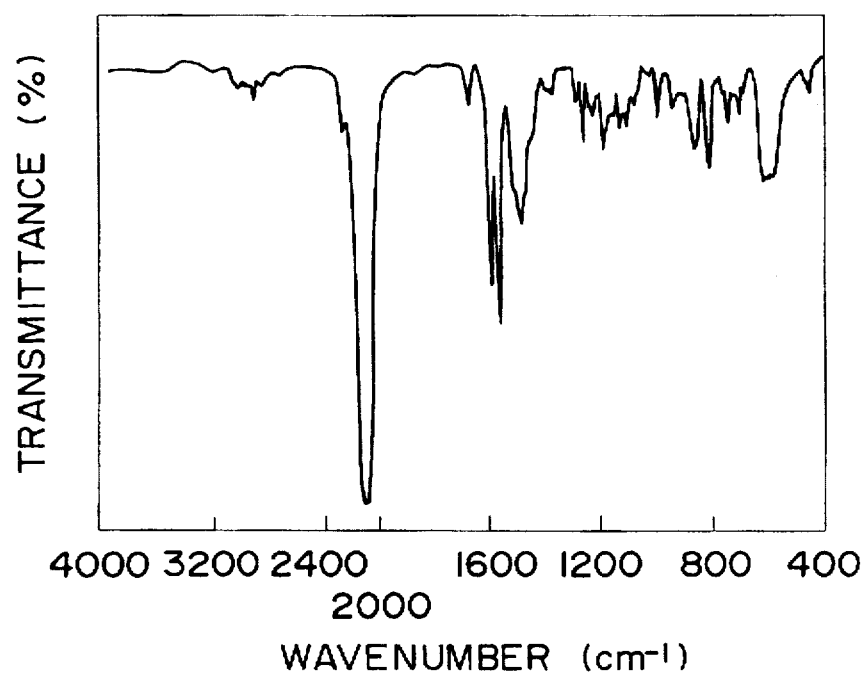

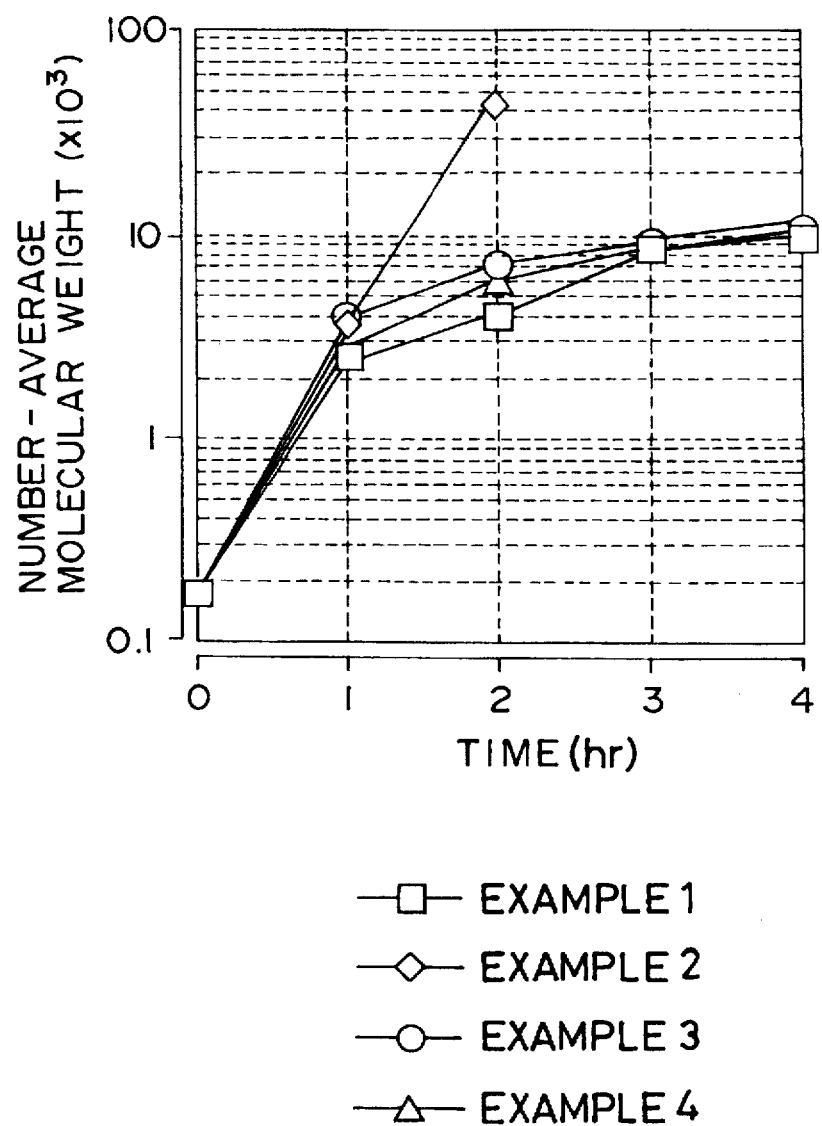

PROCESS FOR THE PREPARATION OF A HIGH-MOLECULAR-WEIGHT POLYCARBODIIMIDE SOLUTION

BACKGROUND OF THE INVENTION

1. Field of the Invention

This invention relates to a process for the preparation of a high-molecular-weight polycarbodiimide solution by using a chlorinated aromatic compound as solvent.

2. Description of the Related Art

Generally known processes for the preparation of polycarbodiimide include, for example, the process of T. W. Campbell et al. (J. Org. Chem., 28, 2069–2075, 1963). According to this process, the desired product is obtained as a precipitate by using a hydrocarbon solvent (e.g., xylene, petroleum ether or benzene) as solvent and carrying out the polymerization reaction under reflux. However, the polycarbodiimide obtained by this process is in an insoluble and infusible form and hence unsuitable for forming and processing.

According to Lyman et al. (Die Makromol. Chem., 67, 1–9, 1963), the polymerization solvent is selected from hydrocarbon solvents such as benzene, xylene and decalin, and chlorinated aromatic compounds such as a mixture of dimethyl sulfoxide and chlorobenzene (1:1) and chlorobenzene. Of these solvents, hydrocarbon solvents produce the product as a solvent in the same manner as observed in the process of Campbell et al. It is described in their article that, when a mixture of dimethyl sulfoxide and chlorobenzene (1:1) was used, a viscous oily solution was obtained in a short time of 10 minutes, but when chlorobenzene alone was used, only a solvent-insoluble solid was obtained.

Amano et al. (Japanese Patent Provisional Publication No. 292316/1990) and Imashiro et al. (Japanese Patent Provisional Publication No. 178954/1993) have disclosed that, by using a chlorinated aliphatic hydrocarbon (e.g., tetrachloroethylene or trichloroethylene) or an alicyclic ether (e.g., tetrahydrofuran or dioxane) as the polymerization solvent, the above-described problems can be solved and polycarbodiimide can hence be obtained in the form of a stable solution.

In recent years, however, legal control over water pollution by chemical substances which are hard to decompose has been being tightened from the viewpoint of environmental protection. Actually, the use of tetrachloroethylene, trichloroethylene and the like has been restricted, and it has become difficult to use them for industrial purposes. Moreover, the industrial use of alicyclic ethers typified by tetrahydrofuran has also become difficult because they are more expensive than general-purpose solvent used for industrial purposes and, in particular, dioxane involves the problem of carcinogenicity.

SUMMARY OF THE INVENTION

An object of the present invention is to provide a process for the preparation of a polycarbodiimide solution which can solve the problems of the prior art and the problems concerning environmental protection and industrial application and which permits a highly stable polycarbodiimide solution to be obtained very easily. That is, the present inventors have now found that this objected can be accomplished by carefully controlling the reaction conditions while using a chlorinated aromatic compound as described above (e.g., chlorobenzene). The present invention has been completed on the basis of this finding.

According to the present invention, the above object can be accomplished by providing a process for the preparation of a high-molecular-weight polycarbodiimide solution which comprises polymerizing an organic diisocyanate in the presence of a carbodiimidation catalyst by using a chlorinated aromatic compound as solvent.

In a preferred embodiment of the present invention, the number-average molecular weight of the high-molecular-weight polycarbodiimide is controlled so as to fall within the range of 5,000 to 60,000.

According to the present invention, a highly stable solution of polycarbodiimide with a high molecular weight can be prepared by using a chlorinated aromatic compound as solvent. Moreover, the problem of environmental protection can be met by using chlorinated aromatic compounds in place of chlorinated aliphatic hydrocarbons which are hard to decompose, and a cost reduction can be achieved on an industrial scale as compared with the use of alicyclic ethers.

The compounds and reaction conditions which are used in the present invention will be specifically described hereinbelow.

Organic Diisocyanate

The organic diisocyanate used as the starting material in the present invention can be selected from aromatic diisocyanates such as 2,4-tolylene diisocyanate and 2,6-tolylene diisocyanate, and aliphatic diisocyanates such as isophorone diisocyanate and 2,4-cyclohexylene diisocyanate. These organic diisocyanates may be used alone or in admixture of two or more.

Carbodiimidation Catalyst

It goes without saying that the carbodiimidation catalyst used in the present invention should be one capable of causing the polymerization reaction to proceed swiftly. No particular limitation is placed on the type of the carbodiimidation catalyst used, so long as it contains neither unreacted organic diisocyanate nor by-products and has high stability in itself. The preferred examples which meet these requirements include cyclic phosphine oxides such as 1-phenyl-2-phospholene-1-oxide, 3-methyl-2-phospholene-1-oxide and 3-methyl-1-phenyl-3phospholene-1-oxide.

Solvent

In the present invention, the polymerization reaction of the organic diisocyanate is carried out in a chlorinated aromatic compound. This chlorinated aromatic compound should preferably has a boiling point of 120° C. or above, and specific examples thereof include chlorobenzene, o-dichlorobenzene and p-chlorotoluene.

Number-Average Molecular Weight

The number-average molecular weight of the polycarbodiimide so formed should preferably be in the range of 5,000 to 60,000, the more preferred range being from 5,000 to 30,000. If the number-average molecular weight is less than 5,000, the polymerization has not proceeded to the fullest extent. This will impair the formability of the polycarbodiimide, so that only a product having low strength may be obtained, for example, in film formation. If it is greater than 60,000, the resulting polycarbodiimide solution will become viscous and may further form a gel. This will also impair the formability of the polycarbodiimide in that purification procedures such as transfer and filtration will be interfered with and in that irregularities may be produced in film formation or the polycarbodiimide may not be formed into a desired shape.

In order to control the molecular weight of the product so that it will fall within the aforesaid range, various reaction conditions such as the concentration of the organic diisocyanate in the solvent, the proportion of the catalyst to the organic diisocyanate, the reaction temperature and the reaction time need to be modified.

Reaction Temperature, Catalyst Amount and Concentration

From the viewpoint of formability, the concentration of the starting organic diisocyanate in the solvent should be in the range of 1 to 20% (w/w) and preferably 2 to 10% (w/w). If it is less than 1% (w/w), this is not desirable from an economic point of view. If it is greater than 20% (w/v), the reaction rate will be too high to control the molecular weight and, moreover, considerable changes in molecular weight may occur during storage.

Consequently, the amount of catalyst used, the reaction temperature and the reaction time need to be considered at organic diisocyanate concentrations of 20% (w/w) or less. The amount of catalyst used should preferably in the range of 0.05 to 0.2 mol%, and the reaction temperature should preferably in the range of 100° to 150° C. and more preferably in the range of 115° to 135° C. If these parameters exceed their respective ranges, the rate of increase of the molecular weight with time will be too high to control it, and if they fall below their respective ranges, the reaction time will be undesirably low from an economic point of view. Under these reaction conditions, the reaction can generally be completed in a time of 1 to 4 hours, though the reaction time is not limited to this range. In order to measured number-average molecular weights, it is preferable to use gel permeation chromatography.

BRIEF DESCRIPTION OF THE DRAWINGS

FIG. 1 is a graph showing the infrared absorption spectrum of the polycarbodiimide solution obtained in Example 1 which is given below; and FIG. 2 is a graph showing changes with time of the molecular weight of polycarbodiimide as observed in Examples 1 to 4 which are give below.

DETAILED DESCRIPTION OF THE PREFERRED EMBODIMENTS

The present invention is further illustrated by the following examples and comparative examples.

EXAMPLE 1

A 100 ml four-necked flask was charged with 5.40 g of 2,4-tolylene diisocyanate (hereinafter abbreviated as "2,4-TDI") and 50 ml of chlorobenzene. As a carbodiimidation catalyst, 12.0 mg of 3-methyl-1-phenyl-3-phospholene-1-oxide (hereinafter abbreviated as "phospholene oxide") was added thereto. Under an atmosphere of nitrogen, this solution was reacted at 120° C. for 4 hours with stirring. The infrared absorption spectrum of the polycarbodiimide solution obtained after completion of the reaction is shown in FIG. 1. Strong absorption due to the carbodiimide linkage was observed at 2142 cm$^{-1}$. Analysis by gel permeation chromatography (hereinafter abbreviated as "GPC") revealed that the number-average molecular weight of the polycarbodiimide solution obtained after completion of the reaction was 10,000 (FIG. 2).

EXAMPLE 2

A 100 ml four-necked flask was charged with 5.40 g of 2,4-TDI and 50 ml of chlorobenzene. As a carbodiimidation catalyst, 12.0 mg of phospholene oxide was added thereto. Under an atmosphere of nitrogen, this solution was reacted at 130° C. for 2 hours with stirring. When the infrared absorption spectrum of the polycarbodiimide solution obtained after completion of the reaction was recorded, strong absorption due to the carbodiimide linkage was observed at 2148 cm$^{-1}$. Analysis by GPC revealed that the number-average molecular weight of the polycarbodiimide solution obtained after completion of the reaction was 58,800 (FIG. 2).

EXAMPLE 3

A 100 ml four-necked flask was charged with 5.40 g of 2,4-TDI and 50 ml of o-dichlorobenzene. As a carbodiimidation catalyst, 12.0 mg of phospholene oxide was added thereto. Under an atmosphere of nitrogen, this solution was reacted at 120° C. for 4 hours with stirring. When the infrared absorption spectrum of the polycarbodiimide solution obtained after completion of the reaction was recorded, strong absorption due to the carbodiimide linkage was observed at 2143 cm$^{-1}$. Analysis by GPC revealed that the number-average molecular weight of the polycarbodiimide solution obtained after completion of the reaction was 12,300 (FIG. 2).

EXAMPLE 4

A 100 ml four-necked flask was charged with 5.40 g of 2,4-TDI and 50 ml of p-chlorotoluene. As a carbodiimidation catalyst, 12.0 mg of phospholene oxide was added thereto. Under an atmosphere of nitrogen, this solution was reacted at 120° C. for 4 hours with stirring. When the infrared absorption spectrum of the polycarbodiimide solution obtained after completion of the reaction was recorded, strong absorption due to the carbodiimide linkage was observed at 2143 cm$^{-1}$. Analysis by GPC revealed that the number-average molecular weight of the polycarbodiimide solution obtained after completion of the reaction was 10,700 (FIG. 2).

Comparative Example 1

A 100 ml four-necked flask was charged with 5.40 g of 2,4-TDI and 50 ml of chlorobenzene. As a carbodiimidation catalyst, 12.0 mg of phospholene oxide was added thereto. Under an atmosphere of nitrogen, this solution was reacted at 130° C. for 4 hours with stirring. The solution remained homogeneous till 2 hours after the start of the reaction at 130° C., but a slight gelation was observed around the stirring rod 3 hours after that. After 3 hours, the number-average molecular weight of the polycarbodiimide solution was believed to exceed 60,000, but the gelation made it impossible to measure it by GPC.

Comparative Example 2

A 100 ml four-necked flask was charged with 5.40 g of a mixture of 2,4-TDI and 2,6-TDI (in a mixing ratio of 80:20), and 50 ml of xylene. As a carbodiimidation catalyst, 12.0 mg of phospholene oxide was added thereto. Under an atmosphere of nitrogen, this solution was reacted at 120° C. for 4 hours with stirring. A rubber-like solid precipitated 2.5 hours after the start of the reaction. When the polycarbodiimide solution obtained 2 hours after the start of the reaction (or immediately before precipitation of the solid) was analyzed by GPC, its number-average molecular weight was 9,800.

Comparative Example 3

A 100 ml four-necked flask was charged with 5.40 g of 2,4-TDI and 50 ml of xylene. As a carbodiimidation catalyst, 12.0 mg of phospholene oxide was added thereto. Under an atmosphere of nitrogen, this solution was reacted at 120° C. for 4 hours with stirring. As contrasted with the case where a mixture of 2,4-TDI and 2,6-TDI (in a mixing ratio of 80:20) was used, no precipitation of a solid was observed till the end of the reaction. However, a sampled solution began to become turbid 3 hours after the start of the reaction. After completion of the reaction, a solid precipitate was observed upon cooling to room temperature. When the polycarbodiimide solution obtained 2 hours after the start of the reaction (or immediately before precipitation of the solid) was analyzed by GPC, its number-average molecular weight was 4,000.

Comparative Example 4

A 100 ml four-necked flask was charged with 5.40 g of 2,4-TDI and 50 ml of anisole. As a carbodiimidation catalyst, 12.0 mg of phospholene oxide was added thereto. Under an atmosphere of nitrogen, this solution was reacted at 120° C. for 4 hours with stirring. Similarly to Comparative Example 3, no precipitation of a solid was observed till the end of the reaction. However, a sampled solution began to become turbid 3 hours after the start of the reaction. After completion of the reaction, a solid precipitate was observed upon cooling to room temperature. When the polycarbodiimide solution obtained 2 hours after the start of the reaction (or immediately before precipitation of the solid) was analyzed by GPC, its number-average molecular weight was 7,000.

We claim:

1. A process for the preparation of a solution of a polycarbodiimide having a molecular average weight of greater than about 5,000 which comprises polymerizing an organic diisocyanate in the presence of a carbodiimidation catalyst by using a chlorinated aromatic compound as solvent.

2. A process for the preparation of a polycarbodiimide solution according to claim 1 wherein the number-average molecular weight of the high-molecular-weight polycarbodiimide is about 5,000 to 60,000.

3. The process of claim 1 wherein the high molecular weight polycarbodiimide has a number average molecular weight of greater than about 5,000.

4. The process of claim 1 wherein the reaction temperature is from 100° to 150° C.

5. The process of claim 1 wherein the concentration of the organic diisocyanate is from 1 to 20% (w/w).

6. The process of claim 1 wherein the concentration of the catalyst is from 0.05–0.2 mol. percent.

7. The process of claim 1 wherein the solvent is selected from the group consisting of chlorobenzene, o-dichlorobenzene, and p-chlorotoluene.

* * * * *